(12) United States Patent
Chilton

(10) Patent No.: US 6,751,703 B2
(45) Date of Patent: Jun. 15, 2004

(54) DATA STORAGE SYSTEMS AND METHODS WHICH UTILIZE AN ON-BOARD CACHE

(75) Inventor: Kendell A. Chilton, Southborough, MA (US)

(73) Assignee: EMC Corporation, Hopkinton, MA (US)

(*) Notice: Subject to any disclaimer, the term of this patent is extended or adjusted under 35 U.S.C. 154(b) by 404 days.

(21) Appl. No.: 09/749,160

(22) Filed: Dec. 27, 2000

(65) Prior Publication Data

US 2002/0083270 A1 Jun. 27, 2002

(51) Int. Cl.⁷ .................................................. G06F 13/20
(52) U.S. Cl. ...................................................... 711/113
(58) Field of Search ............................... 711/112, 113, 711/114, 118

(56) References Cited

U.S. PATENT DOCUMENTS

| | | | |
|---|---|---|---|
| 5,133,060 A | * 7/1992 | Weber et al. | 395/425 |
| 5,396,596 A | * 3/1995 | Hashemi et al. | 395/250 |
| 5,734,861 A | * 3/1998 | Cohn et al. | 395/461 |
| 6,349,357 B1 | * 2/2002 | Chong, Jr. | 711/111 |
| 6,370,605 B1 | * 4/2002 | Chong, Jr. | 710/33 |
| 6,397,267 B1 | * 5/2002 | Chong, Jr. | 710/1 |

* cited by examiner

*Primary Examiner*—Kevin L. Ellis
(74) *Attorney, Agent, or Firm*—Chapin & Huang, L.L.C.; David E. Huang, Esq.

(57) ABSTRACT

The invention is directed to data storage and retrieval techniques that utilize a cache which is preferred to a consumer of a data element stored within that cache. Since the cache is preferred to the consumer, the consumer has less contention for access to the preferred cache vis-à-vis a cache of a conventional data storage system implementation which is typically equally shared throughout the data storage system. Preferably, the preferred cache is on the same circuit board as the consumer so that memory accesses are on the order of a few hundred nanoseconds, rather than several microseconds when the cache and the consumer are on different circuit boards as in a conventional data storage implementation. One arrangement of the invention is directed to a data storage system having a first circuit board, a second circuit board and a connection mechanism that connects the first and second circuit boards together. The first circuit board includes (i) a front-end interface circuit for connecting to an external host, (ii) an on-board cache, and (iii) an on-board switch having a first port that connects to the front-end interface circuit, a second port that connects to the on-board cache, and a third port that connects to the connection mechanism. The second circuit board has a back-end interface circuit for connecting to a storage device. When the front-end interface circuit retrieves (on behalf of a host) a data element (e.g., a block of data) from the storage device through the on-board switch of the first circuit board, the connection mechanism and the back-end interface circuit of the second circuit board, the on-board cache of the first circuit board can retain a copy of the data element for quick access in the future. By configuring the on-board cache to be preferred to the front-end interface circuit and because both the on-board cache and the front-end interface circuit reside on the first circuit board, when the front-end interface circuit accesses the copy of the data element in the on-board cache, there will be less contention and latency compared to that for a highly shared cache of a conventional data storage system implementation.

33 Claims, 7 Drawing Sheets

DATA STORAGE SYSTEMS AND METHODS WHICH UTILIZE AN ON-BOARD CACHE

BACKGROUND OF THE INVENTION

In general, a data storage system stores and retrieves data for one or more external hosts. FIG. 1 shows a high-level block diagram of a conventional data storage system 20. The data storage system 20 includes front-end circuitry 22, a cache 24, back-end circuitry 26 and a set of disk drives 28-A, 28-B (collectively, disk drives 28).

The cache 24 operates as a buffer for data exchanged between external hosts 30 and the disk drives 28. The front-end circuitry 22 operates as an interface between the hosts 30 and the cache 24. Similarly, the back-end circuitry 26 operates as an interface between the cache 24 and the disk drives 28.

FIG. 1 further shows a conventional implementation 32 of the data storage system 20. In the implementation 32, the front-end circuitry 22 includes multiple front-end circuit boards 34. Each front-end circuit board 34 includes a pair of front-end directors 36-A, 36-B. Each front-end director 36 (e.g., the front-end director 36-A of the front-end circuit board 34-1) is interconnected between a particular host 30 (e.g., the host 30-A) and a set of M buses 38 (M being a positive integer) that lead to the cache 24 (individual memory boards), and operates as an interface between that host 30 and the cache 24. Similarly, the back-end circuitry 26 includes multiple back-end circuit boards 40. Each back-end circuit board 40 includes a pair of back-end directors 42-A, 42-B. Each back-end director 42 is interconnected between a particular disk drive 28 and the M buses 38 (a backplane interconnect) leading to the cache 24, and operates as an interface between that disk drive 28 and the cache 24.

It should be understood that the cache 24 is a buffer for host data exchanged between the hosts 30 and the disk drives 28, i.e., the cache 24 is input/output (I/O) memory. Even though the directors 36, 42 include processors that execute program instructions, the directors 36, 42 do not use the cache 24 as processor address space. Rather, each director 36, 42 includes some memory as processor address space.

Each disk drive 28 of the implementation 32 has multiple connections 44, 46 to the cache 24. For example, the disk drive 28-A has a first connection 44-A that leads to the cache 24 through the back-end director 42-A of the back-end circuit board 40-1, and a second connection 46-A that leads to the cache 24 through another back-end director of another back-end circuit board 40 (e.g., a back-end director of the back-end circuit board 40-2).

It should be understood that the redundant features of the data storage system implementation 32 (e.g., the multiple disk drive connections 44, 46 of each disk drive 28, the M buses 38, the circuit boards 34, 44 having multiple directors 36, 42, etc.) provide fault tolerance and load balancing capabilities to the implementation 32. Further details of how the implementation 32 performs data write and read transactions will now be provided.

For a host 30 to store data on the disk drives 28, the host 30 provides the data to one of the front-end directors 36, and that front-end director 36 initiates a write transaction on behalf of that host 30. In particular, the front-end director 36 provides the data to the cache 24 through one of the M buses 38. Next, one of the back-end directors 42 reads the data from the cache 24 through one of the M buses 38 and stores the data in one or more of the disk drives 28 to complete the write transaction. To expedite data transfer, the front-end director 36 can place a message for the back-end director 42 in the cache 24 when writing the data to the cache 24. The back-end director 42 can then respond as soon as it detects the message from the front-end director 36. Similar operations occur for a read transaction but in the opposite direction (i.e., data moves from the back-end director 42 to the cache 24, and then from the cache 24 to the front-end director 36).

SUMMARY OF THE INVENTION

Unfortunately, there are deficiencies to the above-described conventional implementation 32 of the data storage system 20 of FIG. 1. For example, the cache 24 is a highly shared main memory, and the set of M buses 38 is a highly shared interconnection mechanism. As such, arbitration and locking schemes are required to enable the front-end directors 36 and the back-end directors 42 to coordinate use of the cache 24 and the buses 38. These arbitration and locking schemes enable the directors 36, 42 (which equally contend for the highly shared cache 24 and buses 38) to resolve contention issues for memory boards within the cache 24 and for the buses 38. However, in doing so, some directors 36, 42 need to delay their operation (i.e., wait) until they are allocated these highly shared resources. Accordingly, contention for the cache 24 and the buses 38 by the directors 36, 42 is often a source of latency. In some high-traffic situations, the cache 24 and the buses 38 can become such a bottleneck that some external hosts 30 perceive the resulting latencies as unsatisfactory response time delays.

Additionally, since the directors 36, 42 and the cache 24 reside on separate circuit boards (see FIG. 1), there are latencies resulting from the physical distances between the directors 36, 42 and the cache 24. In particular, there are latencies incurred for the electrical signals to propagate through transmission circuitry on one circuit board (e.g., a director 36, 42), through a backplane interconnect (e.g., one of the buses 38), and through receiving circuitry on another circuit board (e.g., the cache memory 24). Typically, such latencies are on the order of microseconds, i.e., a relatively large amount of time compared to circuit board times of a few hundred nanoseconds.

Furthermore, there are scaling difficulties with the implementation 32 of FIG. 1. In particular, as more front-end and back-end circuit boards 34, 40 are added to the system 20 to increase the capacity of the data storage system implementation 32, the more congested the highly shared buses 38 become. Eventually, the addition of further circuit boards 34, 40 results in unsatisfactory delays due to over utilization of the cache 24 and the bus 38, i.e., the arbitration and locking mechanisms become unable to satisfy the access requirements of each director 36, 42.

One course of action to reducing response time of the implementation 32 of FIG. 1 is to replace the M buses 38 with a point-to-point interconnection topology, i.e., a point-to-point channel between each front-end director 36 and memory board of the cache 24, and between each back-end director 42 and memory board of the cache 24. Such a topology would alleviate any bus contention latencies since each director 36, 42 would have immediate access to a communications channel with a memory board of the cache 24. Unfortunately, there could still exist contention difficulties between the directors 36, 42 and the cache memory boards (i.e., highly shared memories), as well as additional physical difficulties in deploying such point-to-point channels between the cache memory boards and each of the contending directors 36, 42 (e.g., physical difficulties in providing memory boards with enough access ports and circuitry for coordinating the use of such access ports).

In contrast to the above-described conventional data storage system implementation 32 of FIG. 1 which is prone to latency deficiencies due to contention for highly shared resources such as a highly shared cache 24 and highly shared buses 38 leading to the cache 24, the invention is directed to data storage and retrieval techniques that utilize a cache which is preferred to a consumer (e.g., a director) of a data element stored within that cache. Since the cache is preferred to the consumer, the consumer has less contention for access to the preferred cache (e.g., less contention from other directors) vis-à-vis the cache 24 of the conventional data storage system implementation 32 of FIG. 1 which is typically equally shared among all of the directors 36, 42 of the data storage system. Preferably, the preferred cache is proximate to the consumer (e.g., on the same circuit board as the consumer) so that memory accesses are on the order of a few hundred nanoseconds, rather than several microseconds when the cache and the consumer are on different circuit boards as in the conventional data storage implementation 32 of FIG. 1.

One arrangement of the invention is directed to a data storage system having a first circuit board, a second circuit board and a connection mechanism that connects the first and second circuit boards together. The first circuit board includes (i) a front-end interface circuit (e.g., a front-end director) for connecting to an external host, (ii) an on-board cache, and (iii) an on-board switch having a first port that connects to the front-end interface circuit, a second port that connects to the on-board cache, and a third port that connects to the connection mechanism. The second circuit board has a back-end interface circuit (e.g., a back-end director) for connecting to a storage device. When the front-end interface circuit retrieves (on behalf of a host) a data element (e.g., a block of data) from the storage device through the on-board switch of the first circuit board, the connection mechanism and the back-end interface circuit of the second circuit board, the on-board cache of the first circuit board can retain a copy of the data element for quick access in the future. With the on-board cache preferred to the front-end interface circuit and both the on-board cache and the front-end interface circuit residing on the first circuit board, when the front-end interface circuit accesses the copy of the data element in the on-board cache, there will be less contention and latency compared to that for the highly shared cache 24 of the conventional data storage system implementation 32 of FIG. 1.

In one arrangement, the on-board switch is configured to selectively provide a first data pathway between the front-end interface circuit and the on-board cache, a second data pathway between the front-end interface circuit and the connection mechanism, and a third data pathway between the on-board cache and the connection mechanism. Accordingly, the on-board switch can selectively route communications between different portions of the circuit board. For example, the on-board switch can provide the second and third data pathways to convey a data element from the connection mechanism simultaneously to the front-end interface circuit and the on-board cache during a read transaction in order to direct the data element to the front-end interface circuit with minimal latency and store a copy of the data element in the on-board cache. Although there is no restriction to buffering a copy of the data element within the on-board switch during this transfer, there is no need to since the on-board switch provides the pathways to the front-end interface circuit and the on-board cache at the same time.

In one arrangement, the front-end interface circuit of the first circuit board is configured to send a request for a data element to the back-end interface circuit of the second circuit board, and the on-board cache of the first circuit board is configured to store the data element on behalf of the front-end interface circuit of the first circuit board when the back-end interface circuit of the second circuit board provides the data element to the front-end interface circuit of the first circuit board in response to the request. Accordingly, the front-end interface circuit can subsequently access the data element again without having to retrieve the data element from the back-end interface circuit a second time.

In one arrangement, the data storage system further includes a global memory circuit board that connects to the connection mechanism. In this arrangement, the global memory circuit has a memory circuit, and the front-end interface circuit of the first circuit board is configured to access a global data element from the memory circuit of the global memory circuit board through the on-board switch of the first circuit board and the connection mechanism. By placing the global data element in the global memory circuit board, the front-end interface circuit of the first circuit board, and other interface circuits, can share access to the global data element. Since the global data element is not stored in the on-board cache of the first circuit board, the other interface circuits do not increase contention for the on-board cache of the first circuit board which could otherwise cause undesirable latencies.

In one arrangement, the connection mechanism includes a main switch. This allows the data storage system to have a hub-and-spoke topology, with the main switch as the hub and the first and second circuit boards as the ends of the spokes. In this arrangement, the front-end interface circuit of the first circuit board is configured to exchange data elements with the back-end interface circuit of the second circuit board through the on-board switch of the first circuit board and the main switch of the connection mechanism.

In one arrangement, the first circuit board further includes a back-end interface circuit for connecting to another storage device. In this arrangement, the on-board switch of the first circuit board includes a fourth port that connects to the back-end interface circuit of the first circuit board. The front-end interface circuit of the first circuit board is configured to exchange data elements with the back-end interface circuit of the first circuit board through the on-board switch of the first circuit board. Accordingly, the first circuit board can essentially operate as a complete data storage system by itself since it includes a front-end interface circuit, a back-end interface circuit and on-board cache.

The features of the invention, as described above, may be employed in data storage systems, devices and methods such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to data storage and retrieval techniques that utilize a cache which is preferred to a consumer (e.g., a director) of a data element stored within that cache. Since the cache is preferred to the consumer, the consumer has less contention for access to the preferred cache (e.g., less contention from other directors) vis-à-vis a conventional data storage system cache which is typically equally shared throughout the data storage system (see FIG. 1). Preferably, the preferred cache is proximate to the consumer (e.g., on the same circuit board as the consumer) so that memory accesses are on the order of a few hundred nanoseconds, rather than several microseconds when the cache and the consumer are on different circuit boards as in a conventional data storage implementation.

Figure 2:
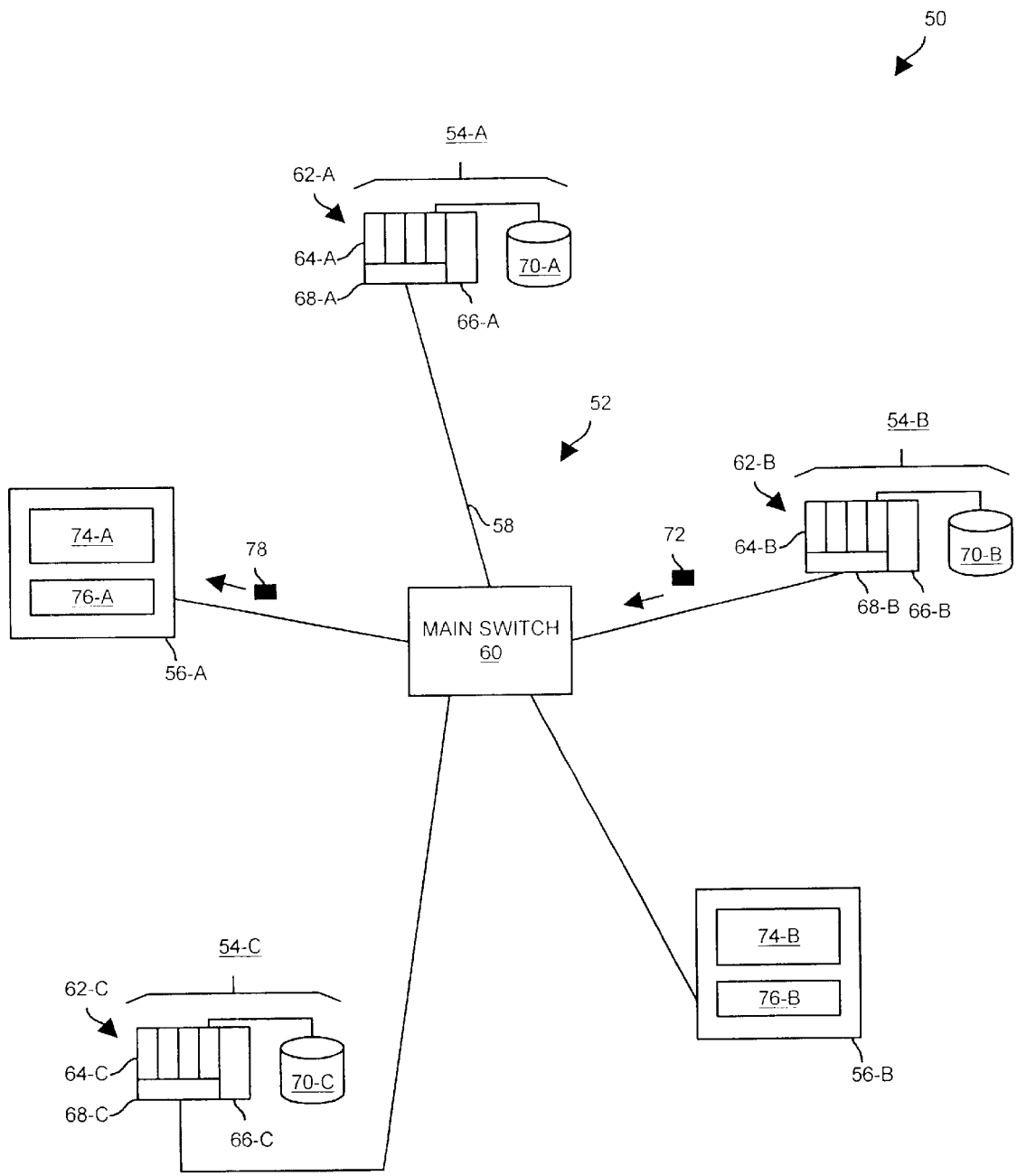
FIG. 2 is a block diagram of a data storage system which is suitable for use by the invention.

FIG. 2 shows a data storage system 50 which is suitable for use by the invention. The data storage system 50 includes a connection mechanism 52, interface assemblies 54-A, 54-B, 54-C (collectively, interface assemblies 54), and global memory circuit boards 56-A, 56-B (collectively, global memory circuit boards 56). Each interface assembly 54 operates as one or more interfaces to the data storage system 50. In particular, each interface assembly 54 can operate as a front-end interface to the data storage system 50, a back-end interface to the data storage system 50, or both. For example, the interface assembly 54-A can operate as a front-end interface (or front-end director) to an external host (e.g., a server). As another example, the interface assembly 54-B can operate as a back-end interface (or back-end director) to a storage device (e.g., a disk drive). As yet another example, the interface assembly 54-C can operate as both a front-end interface to an external host and a back-end interface to a storage device. The global memory circuit boards 56 provide volatile storage for storing global data elements which are accessible by multiple interface assemblies 54. The connection mechanism 52 arranges the interface assemblies 54 and the global memory circuit boards 56 in a cluster-like manner, and carries signals between the interface assemblies 54 and the global memory circuit boards 56.

As shown in FIG. 2, the connection mechanism 52 includes a transmission medium 58 and a main switch 60. The transmission medium 58 carries communications between the interface assemblies 54 and the main switch 60, and between the global memory circuit boards 56 and the main switch 60. The main switch 60 selectively provides pathways for such communications in order to direct the communications between proper sources and destinations in a network-like manner (e.g., routing data blocks, packets, frames, cells, etc.). In one arrangement, such communications include specific device-oriented and block-oriented commands (e.g., SCSI commands). In another arrangement, such communications include network-oriented commands (e.g., IP communications). In yet another arrangement, such communications include both types of commands.

In a large scale arrangement, the interface assemblies 54 and the global memory circuit boards 56 can reside within cabinets, and the main switch 60 can interconnect these cabinets. This arrangement provides another layer of hierarchy and flexibility for the data storage system 50.

Each interface assembly 54 includes a circuit board 62 having a set of interface circuits 64, an on-board cache 66, and an on-board switch 68. Each interface circuit 64 is capable of being configured to operate as a front-end interface to a host (e.g., a front-end director) or a back-end interface to a storage device (e.g., a back-end director). Accordingly, each interface assembly 54 can further include a storage device 70 (e.g., one or more disk drives) provided that at least one of the interface circuits 64 is configured to operate as a back-end interface to the storage device 70. During operation of the data storage system 50, the interface circuits 54 receive and transmit data elements 72 (e.g., blocks of data) among each other to provide data storage services to the external hosts (e.g., servers).

Each global memory circuit board 56 includes a global memory circuit 74, and a port 76 which connects that global memory circuit 74 to the connection mechanism 52. The global memory circuit 74 of each global memory circuit board 56 is capable of storing a global data element 78, i.e., a special type of data element 72 which is accessible (i.e., shared) by multiple interface assemblies 54. As such, it should be understood that the only interface circuits 64 that would contend for access to a particular global memory circuit 74 are the interface circuits 64 of different interface assemblies 54 which want access to a global data element 78 residing within that global memory circuit 74, i.e., the consumers of that global data element 78. Other interface circuits 64 would have no reason to access that global memory circuit 74. Accordingly, there is less contention for access to the global memory circuits 74 than for conventional cache memory boards which hold both shared data and non-shared data.

It should be further understood that the interface circuits 64 are configured to respond to requests for non-shared data elements 72 (i.e., data elements which are not global data elements 78 to be stored in the global memory circuits 74) by providing the data elements 72 to the on-board caches 66 which are closest to the consumers of those data elements 72. For example, suppose that one of the interface circuits 64-A requests a data element 72 from the interface assembly 54-B. An interface circuit 64-B which is configured as a back-end interface circuit (i.e., a director) to the storage device 70-B retrieves the data element 72 and provides that data element 72 to the requesting interface circuit 64-A and to the on-board cache 66-A since the on-board cache 66-A is closest on-board cache 66 to the requesting interface circuit 64-A, i.e., the consumer of the requested data element 72. Accordingly, if the requesting interface circuit 64-A needs to retrieve the data element 72 a second time, it can access the on-board cache 66-A on the same circuit board 62-A (i.e., requiring only a few hundred nanoseconds). As another example, suppose that the same interface circuit 64-A wants to store a data element 72 in the storage device 70-B. That interface circuit 64-A sends that data element 72 to the interface circuit 64-B that operates as the back-end interface circuit for the storage device 70-B and to the on-board cache 66-B since the on-board cache 66-B is the closest on-board cache 66 to the interface circuit 64-B, i.e., the consumer of the data element 72.

Since the only interface circuits 64 that typically access an on-board cache 66 are the interface circuits 64 that either consume or provide the data elements 72 which are stored in that on-board cache 66, the on-board caches 66 are essentially preferred to the consumers of the data elements 72. As a result of so few interface circuits 64 requiring access to the on-board caches 66 (i.e., the data element providers and consumers) there is less contention for access to the on-board caches 66 compared to cache memory boards for the cache 24 of the conventional data storage system implementation 32 of FIG. 1 where each director 36, 42 has equal access to the cache 24 and the buses 38. Accordingly, the lowered contention for the on-board caches 66 provides less latency and improved response times.

Figure 3:
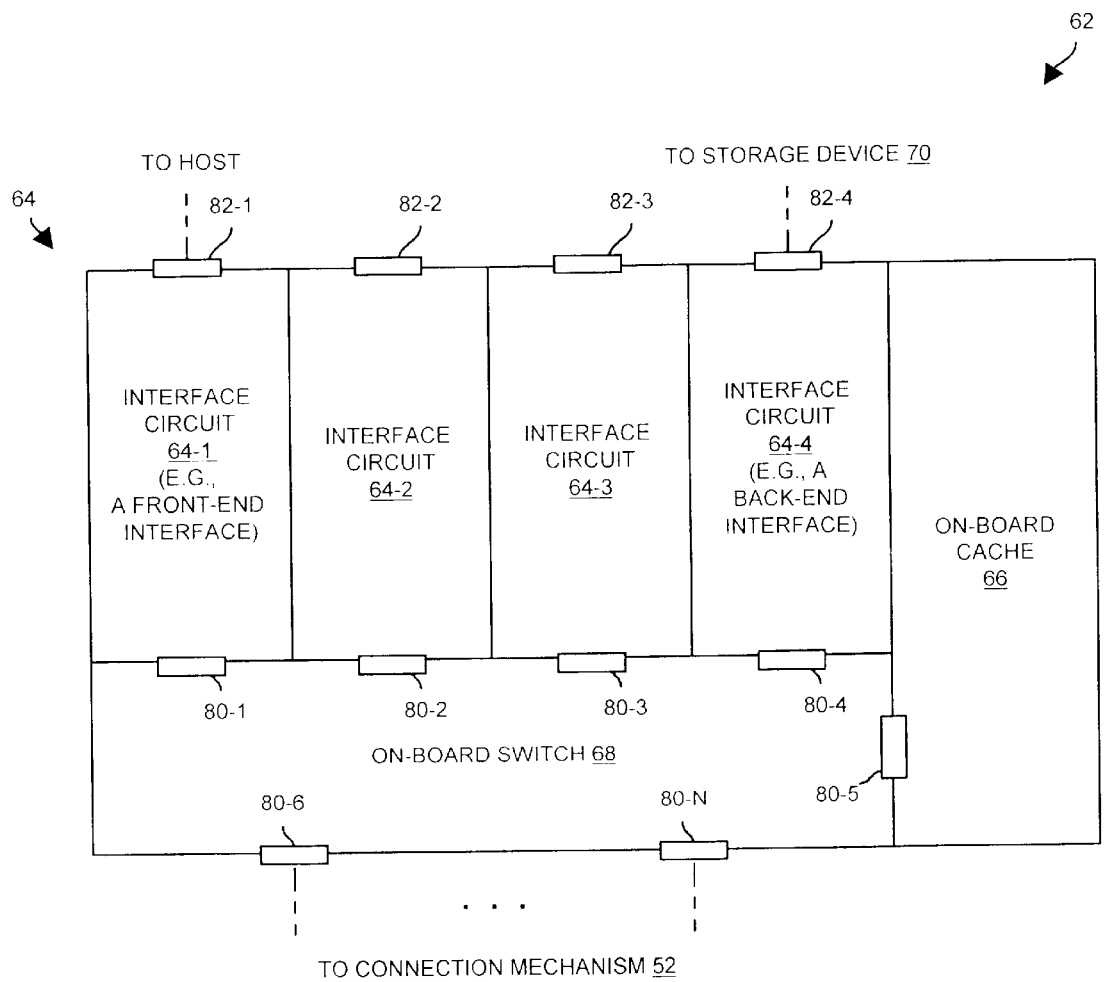
FIG. 3 is a block diagram of a circuit board of the data storage system of FIG. 2.

FIG. 3 shows a block diagram of a circuit board 62 of an interface assembly 54. By way of example only, the circuit board 62 includes a set of four interface circuits 64, one of which is configured as a front-end interface (i.e., interface circuit 64-1) and another of which is configured as a back-end interface (i.e., interface circuit 64-4). The on-board switch 68 of the circuit board 62 includes multiple ports 80 which connect to the interface circuits 64, the on-board cache 66 and the connection mechanism 52. For example, a port 80-1 of the on-board switch 68 connects to the front-end interface circuit 64-1, a port 80-4 connects to the back-end interface circuit 64-4, and port 80-5 connects to the on-board cache 66. Ports 80-6 through 80-N of the on-board switch 68 connect to the connection mechanism 52 (N being a positive integer).

It should be understood that communications between the on-board circuits of the interface assembly circuit board 62 (e.g., an interface circuit 64 accessing the on-board cache 66 through the on-board switch 68) involves communications having circuit board communications times. That is, such communications are on the order of a few hundred nanoseconds rather than several microseconds as with communications between different circuit boards as in the conventional data storage system implementation 32 (see FIG. 1). Accordingly, there is less latency in accessing the on-board cache 66.

As further shown in FIG. 3, each interface circuit 64 includes a port 82 for connecting to an external device. For example, the front-end interface circuit 64-1 includes a port 82-1 that connects to an external host, and the back-end interface circuit 64-4 includes a port 82-4 that connects to an external storage device 70. If either of the interface circuits 64-2, 64-3 are used as front-end interfaces, the port 82 of that interface circuit 62 will connect to a host. Similarly, if either of the interface circuits 64-2, 62-3 are used as back-end interfaces, the port 82 of that interface circuit 62 will connect to a storage device 70.

It should be further understood that the cache 66 is an I/O buffer, or I/O memory, for host data exchanged between external hosts and external storage devices 70. Each interface circuit 64 includes control logic for operating as an interface (i.e., memory, and a processor that executes program instructions stored in the memory). Accordingly, the cache 66 does not need to include any processor address space for the interface circuits 64.

Figure 4:
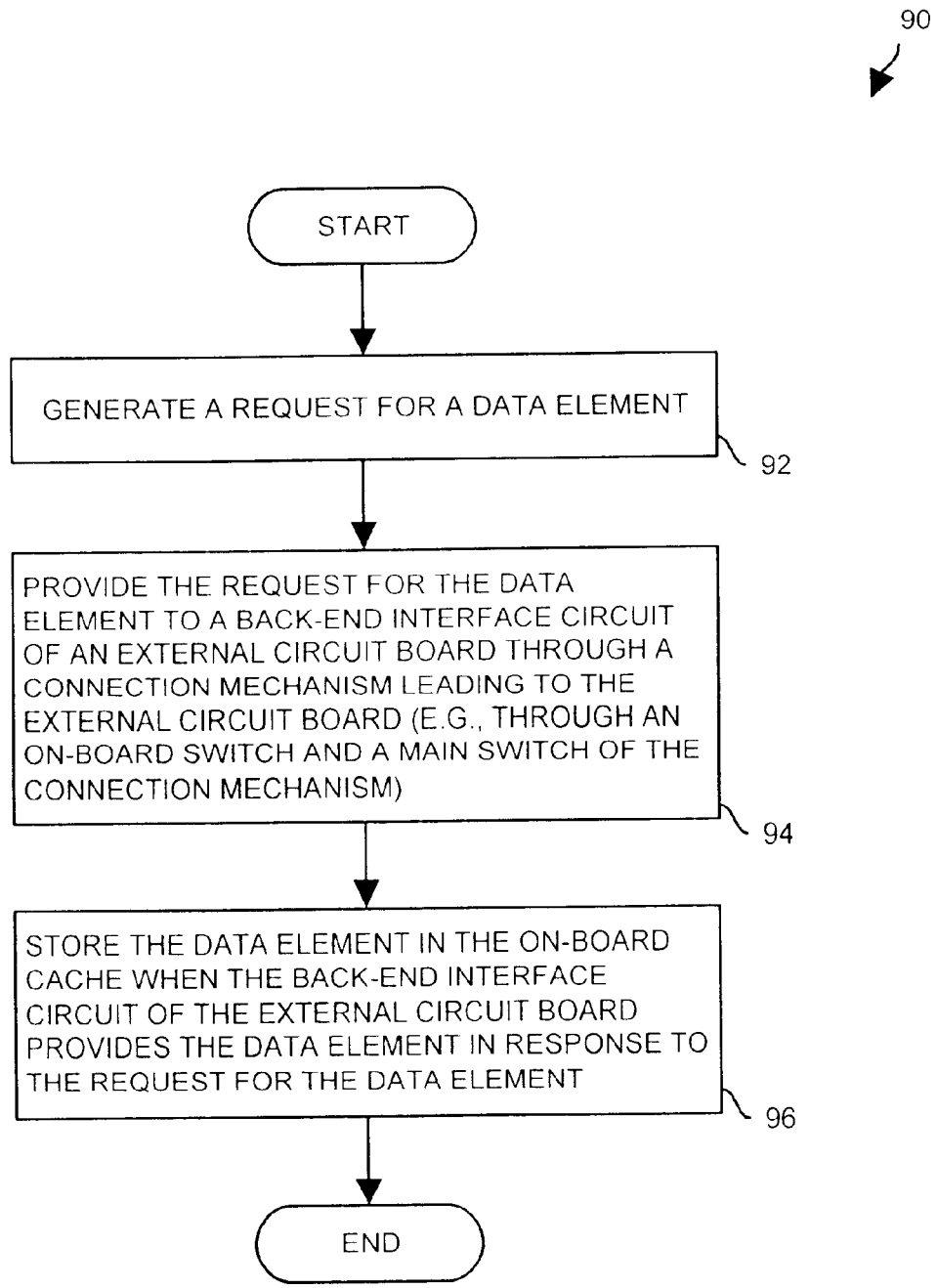
FIG. 4 is a flow chart of a procedure which is performed by the circuit board of FIG. 2.

Further details of how the data storage system 50 operates will now be provided with reference to FIGS. 2 through 4. Suppose that the interface assembly 54-A of FIG. 2 includes a particular front-end interface circuit 64-A that is configured to operate as a front-end interface to an external host (see the front-end interface circuit 64-1 of FIG. 3). Additionally, suppose that the interface assembly 54-B of FIG. 2 includes a particular back-end interface circuit 64-B that is configured to operate as a back-end interface to the storage device 70-B (see the back-end interface circuit 64-4 of FIG. 3 and storage device 70-B of FIG. 2). Further suppose that the particular front-end interface circuit 64-A of the interface assembly 54-A needs to perform a data element read transaction on behalf of the external host by retrieving a data element 72 from the storage device 70-B. In order to retrieve the data element 72, the circuit board 62-A of the interface assembly 54-A performs a procedure 90 which is illustrated in FIG. 4.

In step 92 of FIG. 4, the circuit board 62-A of the interface assembly 54-A generates a request for the data element 72 stored at the interface assembly 54-B. In particular, the front-end interface circuit 64-A of the circuit board 62-A generates the data element request on behalf of the external host.

In step 94, the circuit board 62-A provides the data element request to the back-end interface circuit 54-B. In particular, the front-end interface circuit 64-A of the circuit board 62-A sends the data element request to the circuit board 62-B of the back-end interface circuit 54-B through the on-board switch 68-A and the connection mechanism 52. The back-end interface circuit 64-B of the circuit board 62-B responds to the data element request by retrieving the data element 72 from the storage device 70-B, and providing the data element 72 to the circuit board 64-A through the on-board switch 68-B and the connection mechanism 52.

In step 96, the circuit board 62-A stores the data element 72 in the on-board cache 66 when the back-end interface circuit 64 of the external circuit board provides the data element 72 in response to the data element request. Preferably, the on-board switch 68-A of the circuit board 62-A provides a first pathway between the connection mechanism 52 and the front-end interface circuit 64 of the circuit board 62-A so that the data element 72 travels directly to the particular front-end interface circuit 64 without delay. Simultaneously, the on-board switch 68-A preferably provides a second pathway between the connection mechanism 52 and the on-board cache 66-A so that the data element 72 travels directly to the on-board cache 66-A for immediate storage therein. This dual directing of the data element 72 to the front-end interface circuit 64 and the on-board cache 66-A alleviates the need for buffering the data element 72 within the on-board switch 68-A. Once the data element 72 resides within the on-board cache 66-A the front-end interface circuit 64-A (or other interface circuits 64 of the circuit board 62-A) can access the data element 72 from the on-board cache 66-A without having to retrieve the data element 72 from the interface assembly 54-B a second time.

Figure 1:
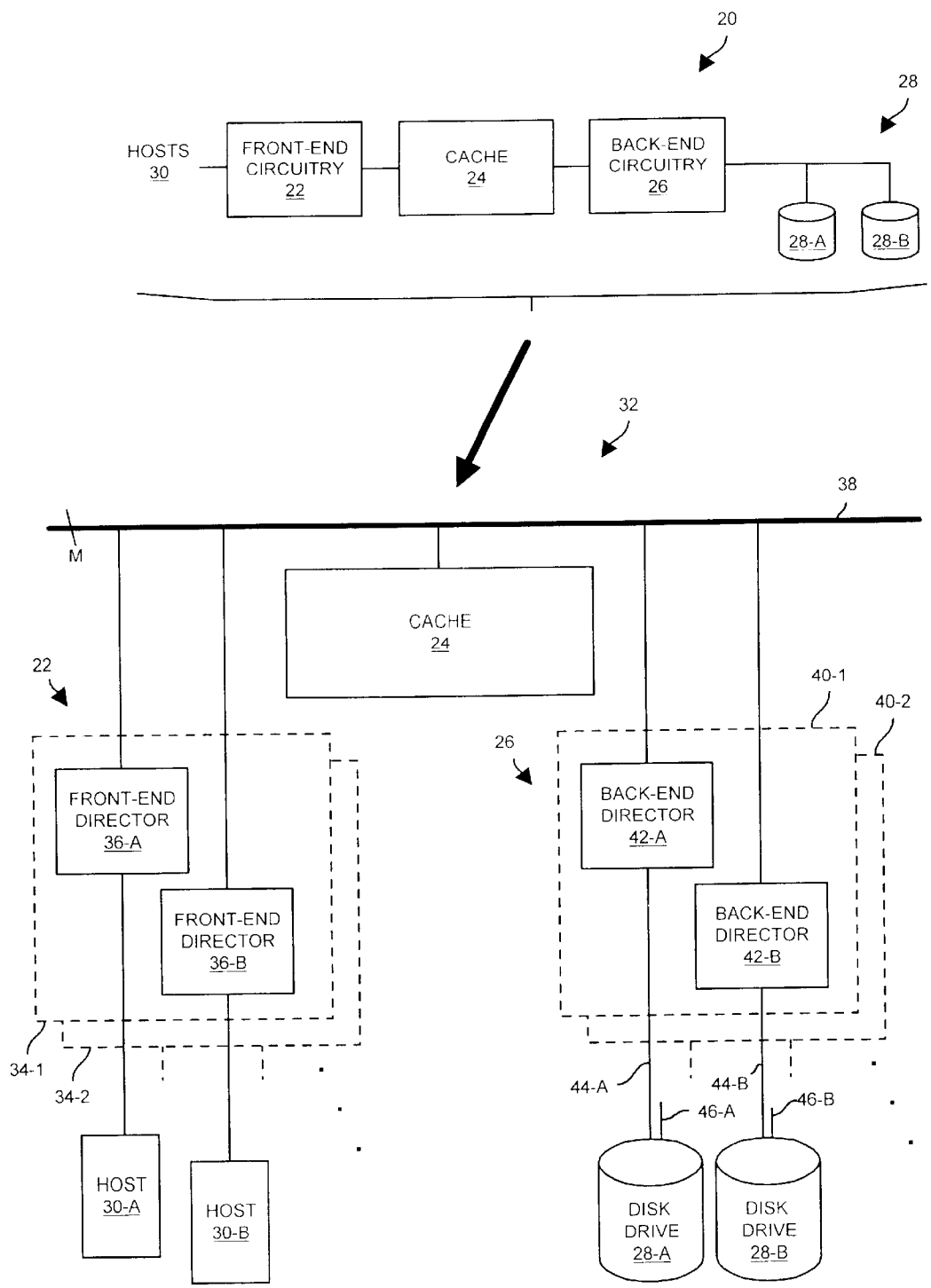
FIG. 1 is a block diagram of a conventional implementation of a data storage system which uses a highly shared cache memory and a highly shared set of buses.

It should be understood that contention for the on-board cache 66-A is preferred to the interface circuits 64-A (i.e., the consumers) compared to contention for the highly shared cache 24 of the conventional data storage implementation 32 of FIG. 1 in which any of the directors 36, 42 can contend for the cache 24. As such, there is less latency with the on-board caches 66 due to the lower amounts of contention for the caches 66, and when such on-board caches 66 are accessed, the retrieval times are typically a few hundred nanoseconds since such communications typically do not need to leave the circuit boards 62.

It should be understood that data storage system 50 handles data element write transactions in a similar manner to read transactions, but the back-end interface circuit to the storage device is considered the consumer of the data element. For example, suppose that the front-end interface circuit 64-A of the interface assembly 54-A needs to perform a write transaction on behalf of the external host by storing a data element 72 in the storage device 70-B of the interface assembly 54-B. In this situation, the front-end interface 64-A sends the data element 72 to the circuit board 62-B of the interface assembly 54-B through the on-board switch 68-A and the connection mechanism 52. The on-board switch 68-B of the circuit board 62-B simultaneously directs the data element 72 to the back-end interface circuit 64-B leading to the storage device 70-B and to the on-board cache 66-B. The back-end interface circuit 64-B (i.e., the consumer of the data element 72) stores the data element 72 in the storage device 70-B, and the on-board cache 66-B stores a copy of the data element 72. Accordingly, a subsequent accesses of the data element 72 (e.g., a read of the data element 72 by a front-end interface circuit 64) can access the copy of the data element 72 stored in the on-board cache 66-B. Again, it should be understood that contention for the on-board cache 66-B is preferred to the interface circuits 64-B (i.e., the consumers) compared to contention for the highly shared cache 24 of the conventional data storage implementation 32 of FIG. 1 in which any of the directors 36, 42 can contend for the cache 24. Accordingly, there is less latency with the on-board caches 66 due to the lower amounts of contention for the caches 66, and when such on-board caches 66 are accessed, the retrieval times are typically a few hundred nanoseconds since such communications typically do not need to leave the circuit boards 62.

It should be further understood that contention for the global memory circuits 74 of the global memory circuit boards 56 is lower than that for the cache 24 of the conventional data storage system implementation 32 of FIG. 1 as well. That is, typically the only interface circuits 64 that contend for access to the global memory circuits 74 are those needing to access a global data element 78. All other accesses typically are to on-board caches 66 of interface assemblies 54. Accordingly, there is less contention for the global memory circuit boards 56 than for the cache 24 of the conventional data storage implementation 32 of FIG. 1 in which any of the directors 36, 42 can contend for access to the cache 24. Further details of the invention will now be provided with reference to FIG. 5.

Figure 5:
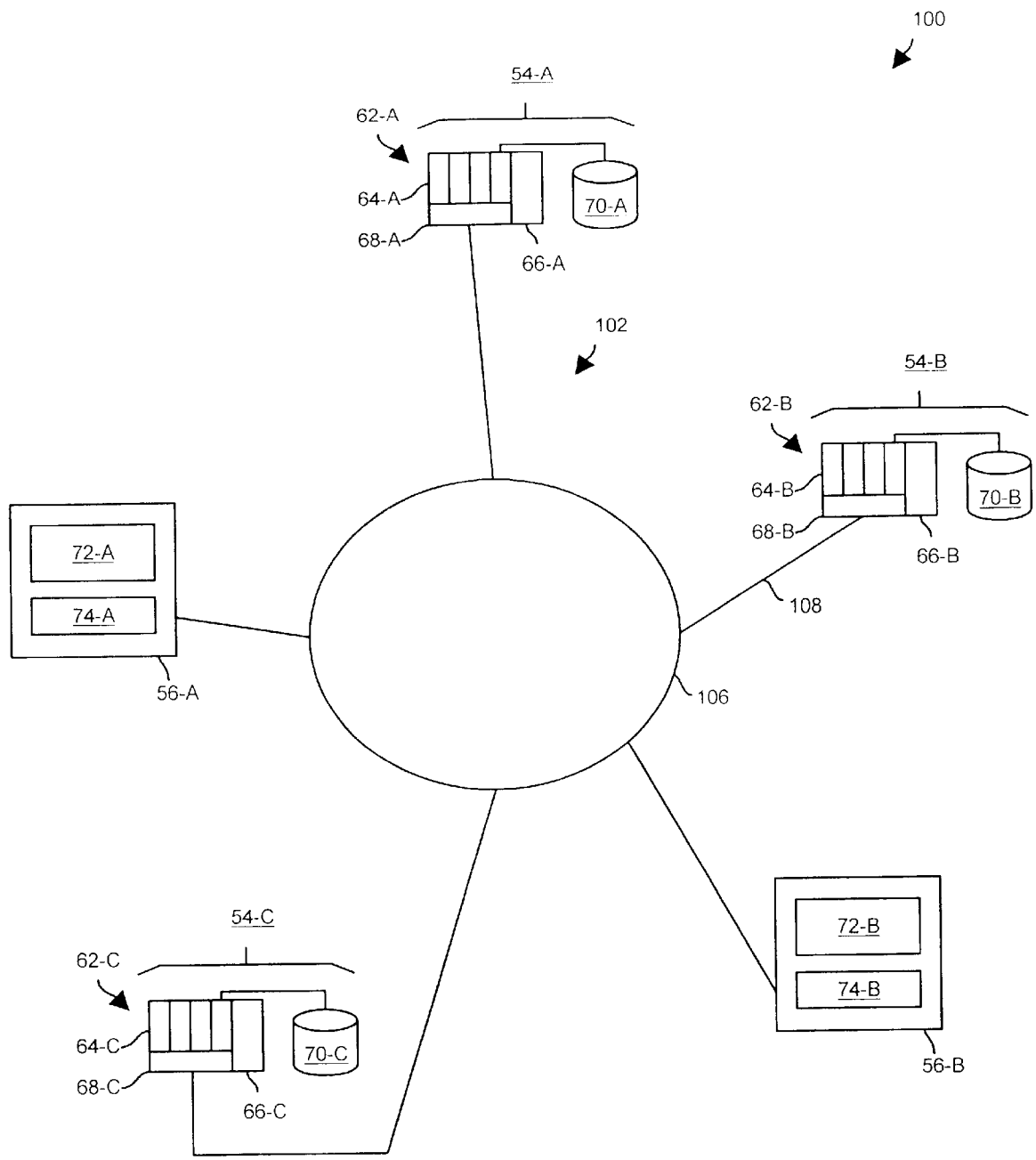
FIG. 5 is a block diagram of an alternative configuration for the data storage system of FIG. 2.

FIG. 5 shows a data storage system 100 which is suitable for use by the invention. The data storage system 100 is similar to the data storage system 50 of FIG. 2 in that the data storage system 100 includes interface assemblies 54 and global memory circuit boards 56. However, the data storage system 100 includes a connection mechanism 102 having an alternative topology to the hub-and-spoke topology of FIG. 2. In particular, the connection mechanism 102 has a ring topology formed by a ring 106 and transmission media 108 that connects the interface assemblies 54 and the global memory circuit boards 56 to the ring 106. The topology of FIG. 5 can reduce hardware costs since there is no need for a main switch 60 as in the data storage system 50 of FIG. 2. In the ring topology of FIG. 5, communications (e.g., data elements 72) travel through the ring 106. For example, a front-end interface circuit 64-A of the interface assembly 54-A retrieves a data element from a back-end interface circuit 64-B of the interface assembly 54-B through the on-board switch 68-B of the interface assembly 54-B, the connecting transmission media 108, the ring 106, more connecting transmission media 108 and the on-board switch 68-A of the interface assembly 54-A.

Additionally, for the data storage system 100 of FIG. 5, a global data storage element 78 is preferably stored in the global memory circuit 74 that is closest to the consumers of that global data storage element 78. For example, suppose that front-end interface circuits 64 of the interface assemblies 54-A and 54-C are consumers of a particular global data element 78 retrieved from the interface assembly 54-B. The global data storage element 78 is preferably stored in the global memory circuit board 56-A since it is the closest global memory circuit board 56 to the interface assemblies 54-A and 54-C through the ring 106 (rather than the global memory circuit board 56-B which is between the interface assemblies 54-B and 54-C). Further details of how the circuit boards 62 of the interface assemblies 54 can be configured to connect to storage devices 70 will now be provided with reference to FIG. 6.

Figure 6:
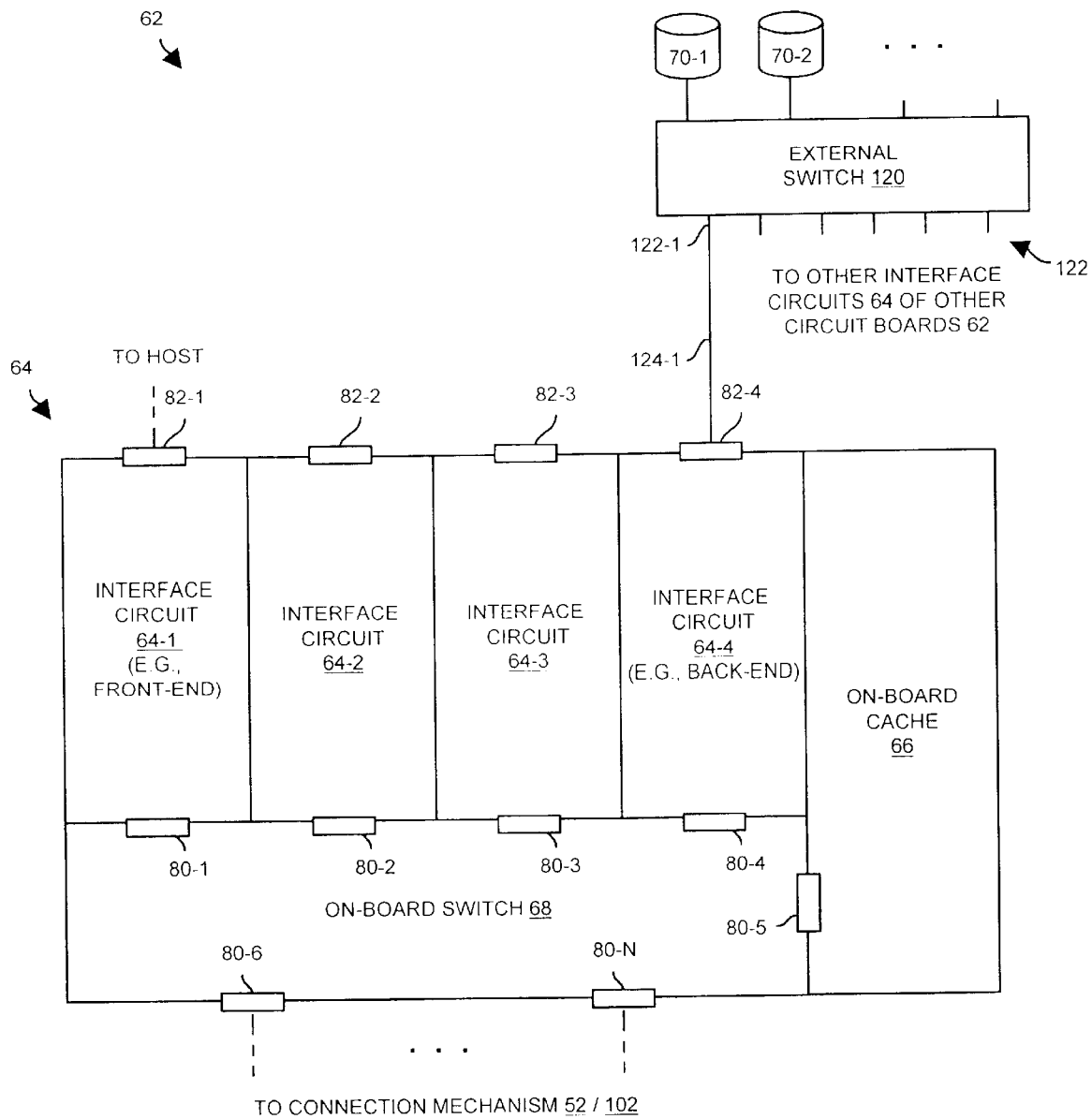
FIG. 6 is a block diagram of the circuit board of FIG. 3 configured to access data elements stored in a storage device through an on-board back-end interface circuit.

Although each interface circuit 64 can be configured as a back-end interface circuit to connect directly to a storage device 70 (e.g., a disk drive), each interface circuit 64 can also be configured as a back-end interface circuit to connect indirectly to multiple storage devices 70 through an external switch 120 as shown in FIG. 6. Here, the interface circuit 64-4 is configured as a back-end interface circuit and connects to the external switch 120. In particular, the port 82-4 of the interface circuit 64-4 connects to a port 122-1 of the external switch 120 through connecting media 124-1. The external switch has other ports 122 that connect to storage devices 70, and other interface circuits 64 of other circuit boards 62.

It should be understood that some data element requests could be handled completely by the circuitry of FIG. 6 without even going out to the connection mechanism 52, 102. In particular, the interface circuit 64-1 which is configured as a front-end interface circuit for an external host can generate a request for a data element 72 on behalf of the host. If the data element 72 resides on the storage devices 70-1, 70-2 of FIG. 6, the interface circuit 64-1 can send the data element request to the interface circuit 64-4 operating as a back-end interface circuit for the storage devices 70-1, 70-2. To this end, the on-board switch 68 provides a pathway between the interface circuits 64-1 and 64-4 so that the communications never need to reach the connection mechanism 52, 102. Rather, they circumvent the connection 52, 102 in a cut-through or bypassing manner. When the interface circuit 64-4 provides the data element 72, the on-board switch 68 can direct the data element 72 to the interface circuit 64-1 with minimal latency, and simultaneously to the on-board cache 66. Accordingly, a subsequent retrieval of the same data element 72 can access the on-board cache 66 rather than re-read the data element 72 from the storage devices 70-1, 70-2. Clustering features of the invention will now be further described with reference to FIG. 7.

Figure 7:
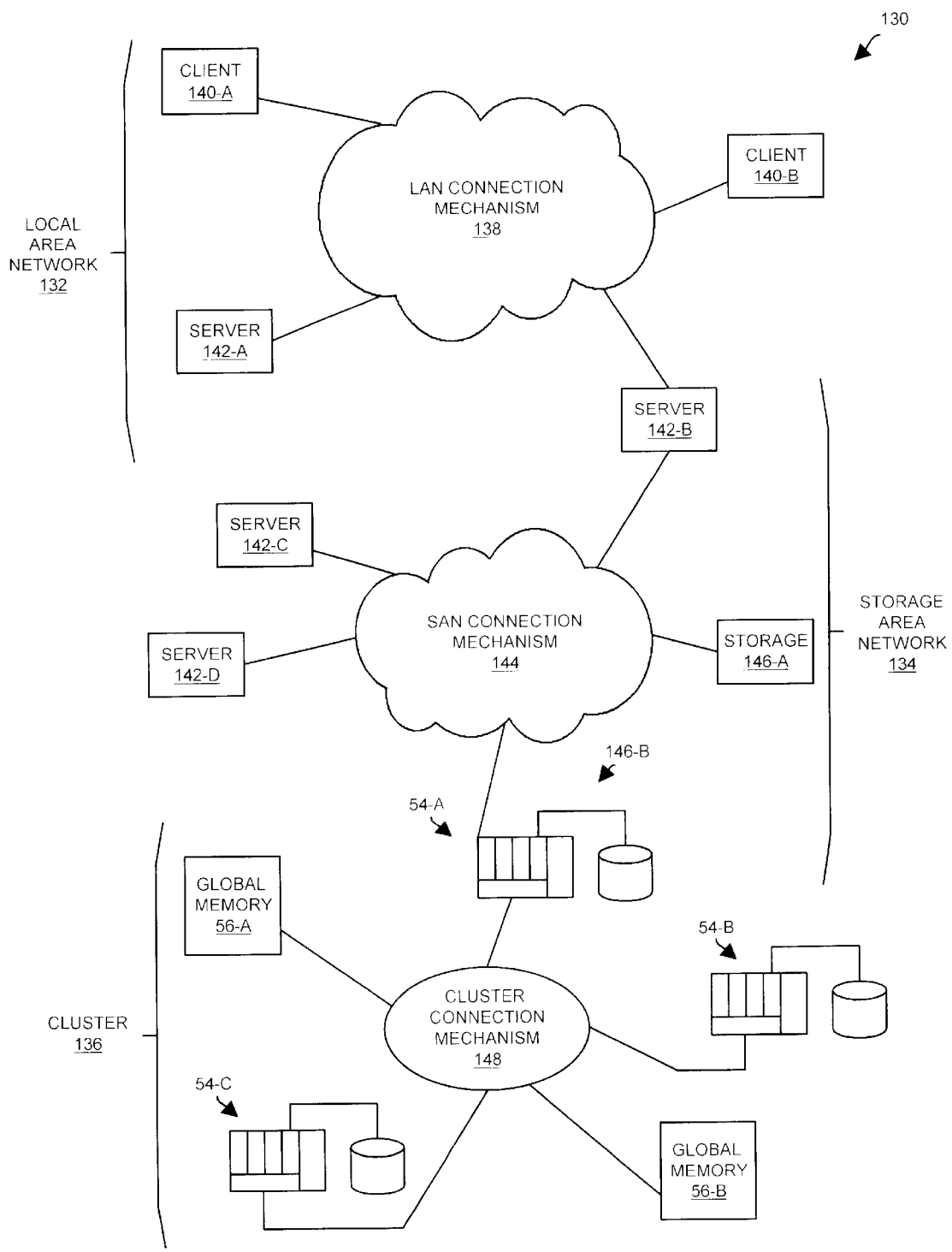
FIG. 7 is a distributed system which includes a cluster that uses the circuit board of FIG. 3.

FIG. 7 shows a distributed system 130 which is suitable for use by the invention. The distributed system 130 includes a local area network (LAN) 132, a storage area network (SAN) 134 and a data storage cluster 136. The LAN 132 includes a LAN connection mechanism 138 (e.g., a combination of transmission media and data communications devices), clients 140 and servers 142 (e.g., mainframes, personal computers, etc.). The SAN 134 includes a SAN connection mechanism 144, servers 142 (some of which are the same servers 142 of the LAN 132) and storage assemblies 146.

The data storage cluster 136 is essentially one of the data storage systems 50, 100 of FIGS. 2 and 5. The data storage cluster 136 includes interface assemblies 54 and global circuit boards 56 as described earlier. At least one of the interface assemblies 54-A operates as a storage assembly 146 of the SAN 134. The cluster connection mechanism 148 (e.g., the hub-and-spoke configuration 52 of FIG. 2, the ring configuration 102 of FIG. 5, etc.) connects the interface assemblies 54 and the global memory circuit boards 56 together.

During operation, the interface assemblies 54 and the global memory circuit boards 56 store and retrieve data elements (e.g., blocks of data) for the various components of the SAN 134 and the LAN 132. For example, the servers 142 of the SAN 134 can operate as external hosts to the data storage cluster 136.

As demand for resources of the cluster 136 increases, more interface assemblies 54 and more global memory circuit boards 56 can be added to increase the capacity of the cluster 136. It should be understood that the circuit boards 62 of the interface assemblies 54 provide hardware circuitry for the cluster 136 with a proper proportion of interface circuits 64 and cache memory 66. For example, if more front-end interface circuits are required in order to handle an increase in host request traffic, one or more circuit boards 62 (i.e., interface assemblies 54) can be added. As another example, if more back-end interface circuits are required in order to handle more storage bandwidth (e.g., striping across more disks), one or more circuit boards 62 can be added to handle the increased back-end demands. With each circuit board 62 comes an appropriate amount of cache memory in the on-board cache 66. There is no special calculation or estimate needed to predict the proper amount of cache memory to add as in expansion procedures for the conventional data storage system implementation 32 of FIG. 1 where directors 36, 42 and cache 24 are independent. Rather, the on-board cache 66 is an appropriate amount for the increase in interface circuits 64 since the on-board cache 66 is preferred or dedicated to the interface circuits 64 because they are on the same circuit board 62. Furthermore, global memory circuit boards 56 can be added as demand for global data elements 78 increases (see FIG. 2).

As described above, the invention is directed to data storage and retrieval techniques that utilize cache memory which is preferred to a consumer (e.g., a director) of a data element stored within that cache memory. Since the cache memory is preferred to the consumer, the consumer has less contention for access to the cache memory (e.g., less contention from other directors) relative to the conventional data storage system cache 24 which is typically shared equally throughout the data storage system implementation 32 (see FIG. 1). Preferably, the cache memory is proximate to the consumer (e.g., on the same circuit board as the consumer) so that memory accesses are on the order of a few hundred nanoseconds, rather than several microseconds when the cache and the consumer are on different circuit boards as in the conventional data storage implementation 32.

It should be understood that there are less scaling difficulties with the data storage systems 50, 100 (see FIGS. 2 and 5) vis-à-vis the conventional data storage system 32 (see FIG. 1). For the data storage systems 50, 100, capacity is increased by adding another interface assembly circuit board 62 having a set of interface circuits 64. An on-board cache 66 is added with each interface assembly circuit board 62 as well. Accordingly, interface circuits 64 and on-board cache 66 are automatically added together, i.e., hand-in-hand.

Moreover, the on-board caches 66 are preferred to the local consumer, i.e., most often accessed by the interface circuits 64 on the same interface assembly circuit board 62 through the on-board switch 68. As a result, as the scale of the data storage systems 50, 100 is increased with the addition of more interface assembly circuit boards 62 and more global memory circuit boards 56, the potential for significant bottlenecks in highly shared resources such as the buses 38 and the cache 24 of the conventional data storage system 32 of FIG. 1 is avoided.

The features of the invention may be particularly useful in data storage systems and computer-related circuits (e.g., fault-tolerant systems) such as those of EMC Corporation of Hopkinton, Mass. For example, the invention can be implemented in computer equipment arranged in a storage area network (SAN) configuration. As another example, the invention can be implemented in computer equipment arranged in a network-attached storage (NAS) configuration. As a particular example, the invention can be implemented in a Symmetrix, which is manufactured by EMC Corporation.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the interface assembly circuit boards 62 were described as including four interface circuits 64 by way of example only. Other numbers of interface circuits 64 are suitable for use by the invention as well (e.g., one, two, eight, 16, etc.). The number of interface circuits 64 affects the number of ports on the interface assembly circuit boards 62 (i.e., the number of on-board switch ports 80 and the number of interface circuit ports 82, see FIG. 3).

Moreover, it should be understood that the circuit board 62 was described above as including both an interface circuit 64-1 configured as a front-end interface, and an interface circuit 64-4 configured as a back-end interface, by way of example only. Alternatively, a circuit board 62 can have any combination of front-end and back-end interfaces (e.g., three front-end interfaces and one back-end interfaces, all front-end interfaces, all back-end interfaces, etc.). Such configurations can be based on capacity needs (i.e., demand).

Additionally, it should be understood that the connection mechanisms 52, 102 were described above as being either hub-and-spoke or ring configurations, by way of example only. Other configurations can be used as well (e.g., backbone, irregular, point-to-point, matrix, etc.).

Furthermore, it should be understood that much of the configuring of the interface circuits 64 can be accomplished using software. For example, each interface circuit 64 can be designed to operate as generic pipe (e.g., processor, memory, pathway from external port 82 to on-board switch port 80, etc.). The interface circuit 64 can then be programmed with instructions in order to operate as a front-end interface circuit on behalf of an external host, a back-end interface circuit on behalf of a storage device 70, and so on. Each interface circuit 64 can know how to communicate with any other interface circuit 64 or global memory circuit 74 by accessing a table that indicates a route within the data storage system 50, 100 (i.e., which ports to take) in order to reach the other interface circuits 64 and global memory circuits 74.

Additionally, it should be understood that the on-board caches 66 were described above as holding non-shared data elements 72, and that the global memory circuit boards 56 were described above as holding shared data elements 78

(special data elements 72), by way of example only. In some arrangements, a copy of the same data element 72 can reside in more than one memory (e.g., in multiple on-board caches 66, in an on-board cache 66 and a global memory circuit board 56, etc.). For example, if there are two interface assemblies 54 that heavily use a particular data element 72, each of the two interface assemblies 54 can have its own copy of that data element 72. Moreover, reflective memory features can be implemented in order to handle synchronization situations, e.g., updating a copy of the data element 72 when another copy of the data element 72 is modified. Such features are intended to be part of the embodiments of the invention.

What is claimed is:

1. A circuit board for a data storage system, comprising:
   a front-end interface circuit for connecting to an external host;
   an on-board cache; and
   an on-board switch having a first port that connects to the front-end interface circuit, a second port that connects to the on-board cache, and a third port for connecting to a connection mechanism of the data storage system.

2. The circuit board of claim 1 wherein the on-board switch is configured to selectively provide a first data pathway between the front-end interface circuit and the on-board cache, a second data pathway between the front-end interface circuit and the connection mechanism, and a third data pathway between the on-board cache and the connection mechanism.

3. The circuit board of claim 1 wherein the front-end interface circuit is configured to exchange data elements with a back-end interface circuit of an external circuit board through the on-board switch and the connection mechanism.

4. The circuit board of claim 3 wherein the front-end interface circuit is configured to send a request for a data element to the back-end interface circuit of the external circuit board, and wherein the on-board cache is configured to store the data element on behalf of the front-end interface circuit when the back-end interface circuit of the external circuit board provides the data element to the front-end interface circuit in response to the request.

5. The circuit board of claim 1 wherein the front-end interface circuit is configured to exchange global data elements with a memory circuit of a global memory circuit board through the on-board switch and the connection mechanism.

6. The circuit board of claim 5 wherein the front-end interface circuit is configured to send a request for a global data element to a back-end interface circuit of an external circuit board, and wherein the memory circuit of the global memory circuit board is configured to store the global data element on behalf of the front-end interface circuit when the back-end interface circuit of the external circuit board provides the global data element to the front-end interface circuit in response to the request.

7. The circuit board of claim 1 wherein the connection mechanism includes a main switch, and wherein the front-end interface circuit is configured to exchange data elements with a back-end interface circuit of an external circuit board through the on-board switch and the main switch of the connection mechanism.

8. The circuit board of claim 1, further comprising:
   an on-board back-end interface circuit for connecting to a storage device, wherein the switch includes a fourth port that connects to the on-board back-end interface circuit, and wherein the front-end interface circuit is configured to exchange data elements with the on-board back-end interface circuit through the on-board switch.

9. The circuit board of claim 8 wherein the on-board back-end interface circuit is configured to connect to the storage device through an external switch, and wherein the front-end interface circuit is configured to exchange data elements with the storage device through the on-board switch, the on-board back-end interface circuit and the external switch.

10. A data storage system, comprising:
    a connection mechanism;
    a first circuit board having (i) a front-end interface circuit for connecting to an external host, (ii) an on-board cache, and (iii) an on-board switch having a first port that connects to the front-end interface circuit, a second port that connects to the on-board cache, and a third port that connects to the connection mechanism; and
    a second circuit board that connects to the connection mechanism, wherein the second circuit board has a back-end interface circuit for connecting to a storage device, and
    wherein the external host is capable of accessing a data element stored on the storage device through the first circuit board, the connection mechanism and the back-end interface circuit of the second circuit boards
    wherein the first circuit board further includes a back-end interface circuit for connecting to another storage device.
    wherein the on-board switch of the first circuit board includes a fourth port that connects to the back-end interface circuit of the first circuit board, and
    wherein the front-end interface circuit of the first circuit board is configured to exchange data elements with the back-end interface circuit of the first circuit board through the on-board switch of the first circuit board.

11. The data storage system of claim 10 wherein the on-board switch is configured to selectively provide a first data pathway between the front-end interface circuit and the on-board cache, a second data pathway between the front-end interface circuit and the connection mechanism, and a third data pathway between the on-board cache and the connection mechanism.

12. The data storage system of claim 10 wherein the front-end interface circuit of the first circuit board is configured to exchange data elements with the back-end interface circuit of the second circuit board through the on-board switch of the first circuit board and the connection mechanism.

13. The data storage system of claim 12 wherein the front-end interface circuit of the first circuit board is configured to send a request for a data element to the back-end interface circuit of the second circuit board, and wherein the on-board cache of the first circuit board is configured to store the data element on behalf of the front-end interface circuit of the first circuit board when the back-end interface circuit of the second circuit board provides the data element to the front-end interface circuit of the first circuit board in response to the request.

14. The data storage system of claim 10, further comprising:
    a global memory circuit board that connects to the connection mechanism, wherein the global memory circuit has a memory circuit, and wherein the front-end interface circuit of the first circuit board is configured to exchange global data elements with the memory circuit of the global memory circuit board through the on-board switch of the first circuit board and the connection mechanism.

15. The data storage system of claim 14 wherein the front-end interface circuit of the first circuit board is configured to send a request for a global data element to the back-end interface circuit of the second circuit board, and wherein the memory circuit of the global memory circuit board is configured to store the global data element on behalf of the front-end interface circuit of the first circuit board when the back-end interface circuit of the second circuit board provides the global data element to the front-end interface circuit of the first circuit board in response to the request.

16. The data storage system of claim 10 wherein the connection mechanism includes a main switch, and wherein the front-end interface circuit of the first circuit board is configured to exchange data elements with the back-end interface circuit of the second circuit board through the on-board switch of the first circuit board and the main switch of the connection mechanism.

17. The data storage system of claim 1 wherein the back-end interface circuit of the first circuit board is configured to connect to the other storage device through an external switch, and wherein the front-end interface circuit of the first circuit board is configured to exchange data elements with the other storage device through the on-board switch of the first circuit board, the back-end interface circuit of the first circuit board and the external switch.

18. The circuit board of claim 1 wherein the front-end interface includes a first front-end interface port which is configured to lead to the external host, and a second front-end interface port which is configured to lead to the first port of the on-board switch; and wherein the front-end interface circuit is configured to transfer data between the external host and the on-board cache through the on-board switch, and between the external host and the connection mechanism through the on-board switch.

19. The circuit board of claim 18 wherein the on-board switch includes a fourth port; wherein the circuit board further comprises:
a back-end interface circuit having a first back-end interface port configured to lead to a storage device, and a second back-end interface port configured to connect to the fourth port of the on-board switch; and wherein the back-end interface circuit is configured to transfer data between the storage device and the on-board cache through the on-board switch, and between the storage device and the connection mechanism through the on-board switch.

20. The circuit board of claim 18 wherein the on-board switch includes a fourth port; wherein the circuit board further comprises:
another front-end interface circuit having another first front-end interface port configured to lead to another external host, and another second front-end interface port configured to connect to the fourth port of the on-board switch; and wherein the other front-end interface circuit is configured to transfer data between the other external host and the on-board cache through the on-board switch, and between the other external host and the connection mechanism through the on-board switch.

21. The circuit board of claim 1 wherein the on-board switch includes:
at least two ports configured to connect to the connection mechanism;
at least one port configured to connect to the on-board cache; and
at least two ports configured to connect to interface circuits.

22. The circuit board of claim 21 wherein the on-board switch includes:
four ports for connecting to four interface circuits, the four interface circuits including the front-end interface circuit.

23. The data storage system of claim 10 wherein the front-end interface circuit of the first circuit board includes a first front-end interface port which is configured to lead to the external host, and a second front-end interface port which is configured to lead to the first port of the on-board switch; and wherein the front-end interface circuit is configured to transfer data between the external host and the on-board cache through the on-board switch, and between the external host and the connection mechanism through the on-board switch.

24. The data storage system of claim 23 wherein the back-end interface circuit of the first circuit board has a first back-end interface port configured to lead to another the other storage device, and a second back-end interface port configured to connect to the fourth port of the on-board switch; and wherein the back-end interface circuit of the first circuit board is configured to transfer data between the other storage device and the on-board cache through the on-board switch, and between the other storage device and the connection mechanism through the on-board switch.

25. The data storage system of claim 23 wherein the on-board switch includes a fifth port; wherein the first circuit board further comprises:
another front-end interface circuit having another first front-end interface port configured to lead to another external host, and another second front-end interface port configured to connect to the fifth port of the on-board switch; and wherein the other front-end interface circuit is configured to transfer data between the other external host and the on-board cache through the on-board switch, and between the other external host and the connection mechanism through the on-board switch.

26. The data storage system of claim 10 wherein the on-board switch of the first circuit board includes:
at least two ports configured to connect to the connection mechanism;
at least one port configured to connect to the on-board cache; and
at least two ports configured to connect to interface circuits.

27. The circuit board of claim 1 wherein the front-end interface circuit includes processing circuitry which is configured to perform data storage transactions with the on-board cache on behalf of the external host.

28. The circuit board of claim 27 wherein data elements pass through the front-end interface circuit as the processing circuitry performs the data storage transactions with the on-board cache on behalf of the external host.

29. The circuit board of claim 28 wherein the on-board switch is configured to communicate with a separate back-end board that connects to the connection mechanism, wherein the separate back-end board has a back-end interface circuit for connecting to a storage device, and wherein the processing circuitry of the front-end interface is configured to convey a data element between the external host and the storage device through the connection mechanism and the back-end interface circuit of the separate back-end board.

30. The circuit board of claim 29 wherein the circuit board further comprises:
   a back-end interface circuit for connecting to another storage device, wherein the on-board switch of the circuit board includes a fourth port that connects to the back-end interface circuit of the circuit board, and wherein the front-end interface circuit of the circuit board is configured to exchange data elements with the back-end interface circuit of the circuit board through the on-board switch of the circuit board.

31. The circuit board of claim 30 wherein the back-end interface circuit of the circuit board is configured to connect to the other storage device through an external switch, and wherein the front-end interface circuit of the circuit board is configured to exchange data elements with the other storage device through the on-board switch of the circuit board, the back-end interface circuit of the circuit board and the external switch.

32. The circuit board of claim 28 wherein the circuit board further comprises:
   a back-end interface circuit for connecting to a storage device, wherein the on-board switch includes a fourth port that connects to the back-end interface circuit, and wherein the front-end interface circuit is configured to exchange data elements with the back-end interface circuit through the on-board switch.

33. The circuit board of claim 32 wherein the back-end interface circuit is configured to connect to the storage device through an external switch, and wherein the front-end interface circuit is configured to exchange data elements with the storage device through the on-board switch, the back-end interface circuit and the external switch.

* * * * *